United States Patent
Matsumoto et al.

(10) Patent No.: US 9,042,426 B1
(45) Date of Patent: May 26, 2015

(54) WIRELESS COMMUNICATION SYSTEM

(71) Applicant: DENSO CORPORATION, Kariya, Aichi-pref. (JP)

(72) Inventors: Munenori Matsumoto, Kariya (JP); Akira Takaoka, Okazaki (JP); Toshihiro Wakamatsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/411,110

(22) PCT Filed: Jun. 20, 2013

(86) PCT No.: PCT/JP2013/003848
§ 371 (c)(1),
(2) Date: Dec. 24, 2014

(87) PCT Pub. No.: WO2014/002443
PCT Pub. Date: Jan. 3, 2014

(30) Foreign Application Priority Data

Jun. 29, 2012 (JP) ................................. 2012-146522

(51) Int. Cl.
*H04B 1/00* (2006.01)
*H04B 1/692* (2011.01)
*H04W 72/04* (2009.01)

(52) U.S. Cl.
CPC ........... *H04B 1/692* (2013.01); *H04W 72/0453* (2013.01)

(58) Field of Classification Search
CPC ........................... H04B 1/692; H04W 72/0453
USPC ....................................................... 375/131
See application file for complete search history.

(56) References Cited

U.S. PATENT DOCUMENTS

2002/0172262 A1 11/2002 Sugaya et al.
2008/0232431 A1* 9/2008 Sanji et al. .................... 375/130

(Continued)

FOREIGN PATENT DOCUMENTS

JP H1079720 A 3/1998
JP 2000104429 A 4/2000

(Continued)

OTHER PUBLICATIONS

International Search Report dated Jul. 16, 2013 in the corresponding International Application No. PCT/JP2013/003848.
Written Opinion (in Japanese with English Translation) for PCT/JP2013/003848, mailed Jul. 16, 2013; ISA/JP.

*Primary Examiner* — Juan A Torres
(74) *Attorney, Agent, or Firm* — Harness, Dickey & Pierce, PLC

(57) ABSTRACT

A wireless communication system includes a mobile device carried by a user and an in-vehicle apparatus equipped to a vehicle and communicatively connected with the mobile device. The in-vehicle apparatus includes a transmission unit, a transmission control unit, a reception determination unit, and a position determination unit. The transmission unit transmits low-frequency band request signals generated by spread modulating transmission data with predetermined spreading factors. The transmission control unit controls the transmission unit to generate and transmit first and second request signals having first and second attainable ranges by spread modulation using first and second spreading factors, respectively. The reception determination unit performs reception determination to response signal transmitted from the mobile device in response to the request signal. The position determination unit specifies the first attainable range or the second attainable range as a mobile device position area in response to a reception determination result.

4 Claims, 8 Drawing Sheets

(56) References Cited

U.S. PATENT DOCUMENTS

| | | |
|---|---|---|
| 2009/0150310 A1* | 6/2009 | Okada .............................. 706/12 |
| 2009/0251376 A1 | 10/2009 | Takahashi et al. |
| 2009/0282163 A1 | 11/2009 | Washiro |
| 2009/0323772 A1* | 12/2009 | Sanji et al. .................... 375/141 |
| 2010/0003940 A1* | 1/2010 | Sanji et al. .................... 455/254 |
| 2010/0232478 A1* | 9/2010 | Sanji et al. .................... 375/150 |
| 2011/0128995 A1* | 6/2011 | Sanji et al. .................... 375/145 |

FOREIGN PATENT DOCUMENTS

| | | |
|---|---|---|
| JP | 2003110531 A | 4/2003 |
| JP | 2009253576 A | 10/2009 |
| JP | 2009272874 A | 11/2009 |
| JP | 2010001642 A | 1/2010 |
| JP | 2011021369 A | 2/2011 |
| JP | 2012107377 A | 6/2012 |

* cited by examiner

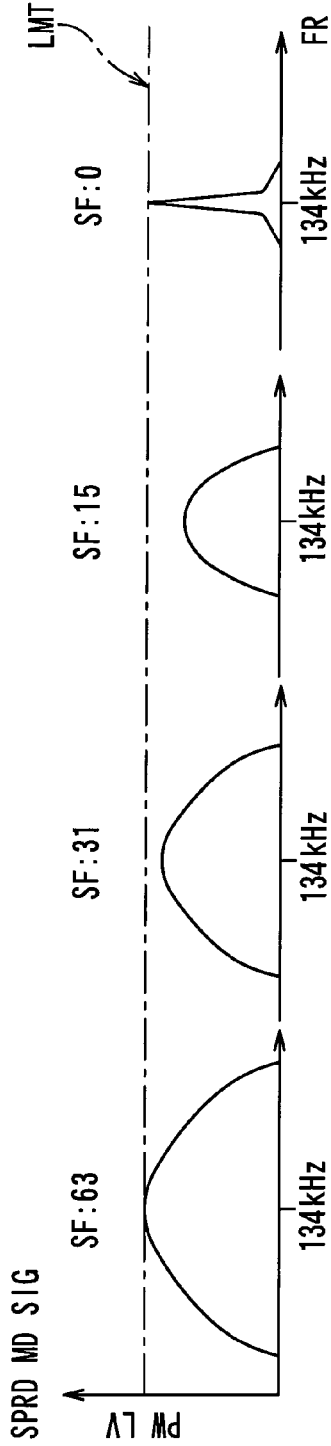
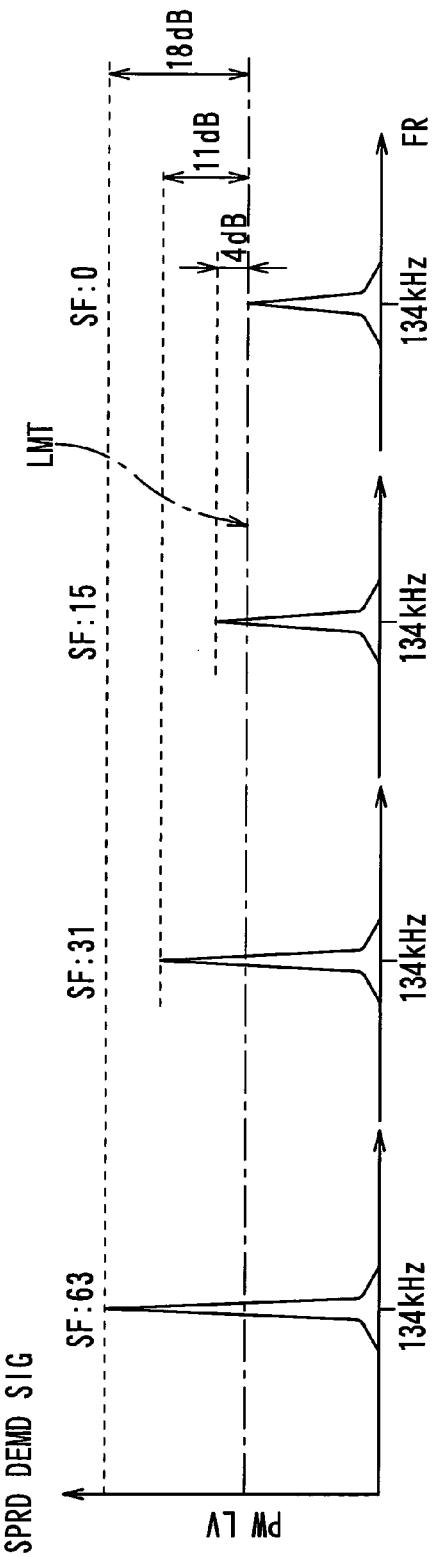

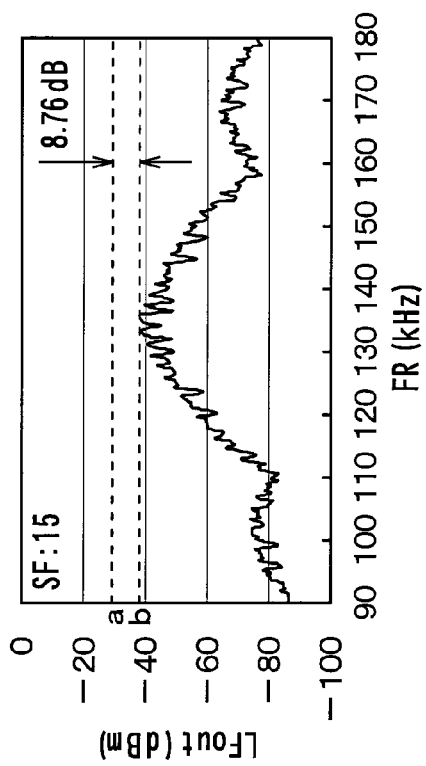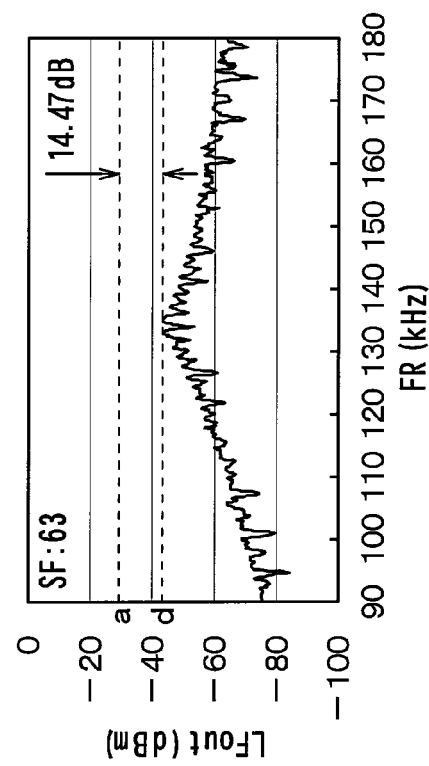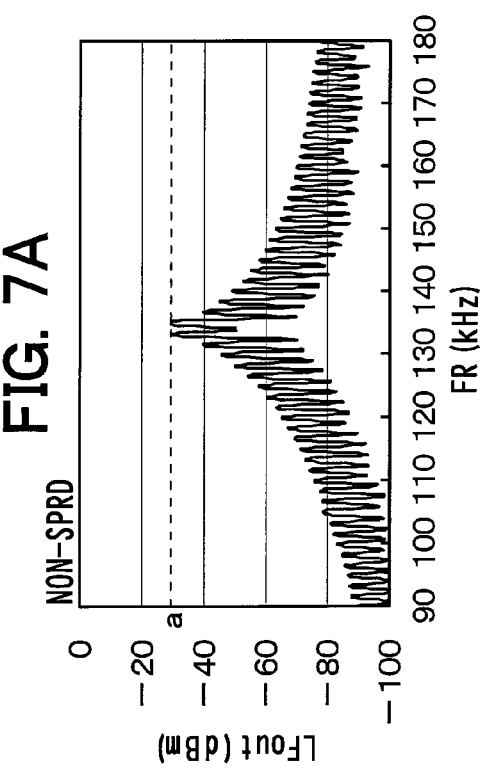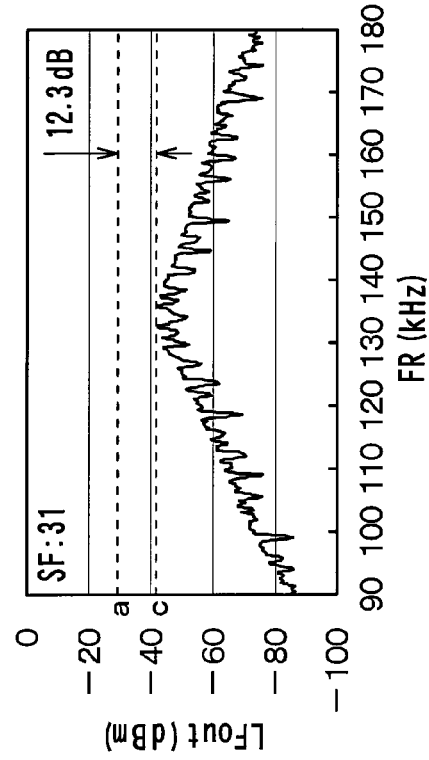

WIRELESS COMMUNICATION SYSTEM

CROSS-REFERENCE TO RELATED APPLICATIONS

This application is a U.S. National Phase Application under 35 U.S.C. 371 of International Application No. PCT/JP2013/003848 filed on Jun. 20, 2013 and published in Japanese as WO 2014/002443 A1 on Jan. 3, 2014. This application is based on and claims the benefit of priority from Japanese Patent Application No. 2012-146522 filed on Jun. 29, 2012. The entire disclosures of all of the above applications are incorporated herein by reference.

TECHNICAL FIELD

The present disclosure relates to a wireless communication system including a mobile device carried by a user and an in-vehicle apparatus equipped to a vehicle.

BACKGROUND ART

Conventionally, a wireless communication system includes an in-vehicle apparatus equipped to a vehicle and a mobile device carried by a user, and the in-vehicle apparatus and the mobile device perform duplex communication with each other. As an example of the wireless communication system, a smart system is widely known. In this smart system, a vehicle-side request signal is transmitted from the in-vehicle apparatus to the mobile device using an LF band so that the vicinity of the vehicle is a communication area and a mobile-side signal is replied from the mobile device to the in-vehicle apparatus in response to the vehicle-side request signal, and the in-vehicle apparatus actuates an actuator (door unlocking device, door locking device, lamp device, or the like) in the vehicle.

With respect to above-described smart system technology, there is a demand for broadening an attainable range of the vehicle-side request signal. One of methods for broadening the attainable range of the request signal is to extend an LF output of the in-vehicle apparatus. However, a strength of the request signal to be transmitted increases with an extension of the LF output. Therefore, when there is a limit to an increase of the field strength of the request signal (for example, when intensities higher than a certain upper limit are prohibited by the Radio Law), the method of extending the LF output cannot be applied in order to broaden the attainable range of the vehicle-side request signal.

If the attainable range of the vehicle-side request signal is broadened, the area within which the mobile device is positioned is extended, and the position of the mobile device cannot be accurately specified. This may prevent the enhancement of marketability.

That is, for the enhancement of marketability, it is required not only to broaden the attainable range of the vehicle-side request signal but also to enable the more accurate specification of the area where the mobile device is positioned.

PRIOR ART LITERATURES

Patent Literatures

Patent Literature 1: JP 2000-104429 A
Patent Literature 2: JP 2010-001642 A

SUMMARY OF INVENTION

In view of the foregoing difficulties, it is an object of the present disclosure to provide a wireless communication system which is able to keep a field strength of a request signal from an in-vehicle apparatus to a mobile device within a proper range, and is able to broaden an attainable range of the request signal and more accurately specify a position of the mobile device.

According to an aspect of the present disclosure, a wireless communication system includes a mobile device carried by a user and an in-vehicle apparatus equipped to a vehicle and communicatively connected with the mobile device. The in-vehicle apparatus includes a transmission unit, a transmission control unit, a reception determination unit, and a position determination unit. The transmission unit generates request signals by performing a spread spectrum modulation to a transmit data with a plurality of predetermined spreading factors, and transmits each of the request signals to the mobile device. Each of the request signals has a frequency within a low frequency band. The request signals include a first request signal and a second request signal, and the spreading factors include a first predetermined spreading factor and a second predetermined spreading factor. The transmission control unit sets the first predetermined spreading factor and sets the second predetermined spreading factor based on the first predetermined spreading factor, and controls the transmission unit to generate and transmit each of first request signal and the second request signal to the mobile device. The transmission control unit controls the transmission unit to generate the first request signal having a first attainable range by performing the spread spectrum modulation to the transmit data with the first predetermined spreading factor. The transmission control unit controls the transmission unit to generate the second request signal having a second attainable range by performing the spread spectrum modulation to the transmit data with the second predetermined spreading factor. The reception determination unit determines a reception of a response signal from the mobile device. The mobile device transmits the response signal in response to a reception of a target request signal that is one of the first request signal and the second request signal. The position determination unit specifies the first attainable range or the second attainable range as an area where the mobile device is positioned when the reception determination unit determines the reception of the response signal.

According to the above wireless communication system, an attainable range of the request signal, which is transmitted from the in-vehicle apparatus to the mobile device, can be broadened while maintaining a field strength of the request signal within a proper range, and a position of the mobile device can be specified more accurately.

BRIEF DESCRIPTION OF DRAWINGS

The above and other objects, features and advantages of the present disclosure will become more apparent from the following detailed description made with reference to the accompanying drawings. In the drawings:

FIG. 6A is a diagram showing power levels of spectrum modulation signals which are modulated by spreading factors of 63, 31, 15, and 0, and FIG. 6B is a diagram showing power levels of de-spread demodulation signals corresponding to the spread spectrum modulation signals that are modulated by spreading factors of 63, 31, 15, and 0;

FIG. 7A is a diagram showing a power level of an original signal transmitted from an LF transmitting antenna, and FIG. 7B to FIG. 7D are diagrams showing power levels of a spread modulation signal transmitted from an LF transmitting antenna when the original signal is modulated by the spreading factors of 15, 31, and 63, respectively;

EMBODIMENTS FOR CARRYING OUT INVENTION

Figure 1:
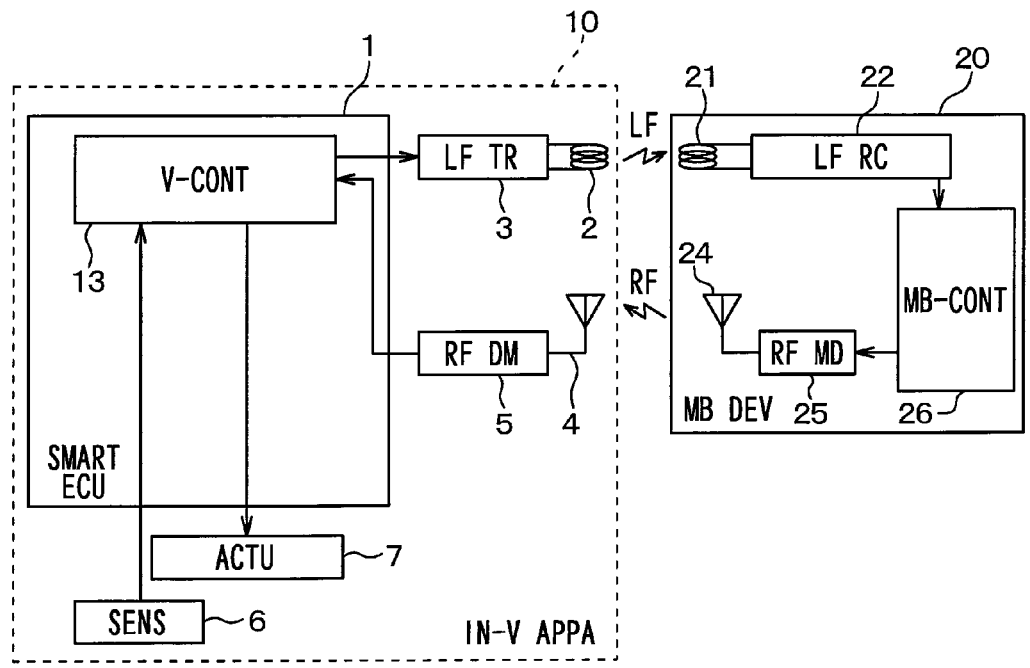
FIG. 1 is a drawing illustrating a configuration of a wireless communication system according to an embodiment of the present disclosure.

FIG. 1 illustrates a configuration of a wireless communication system according to an embodiment. In the present embodiment, the wireless communication system is configured as a smart system applied to a vehicle. The smart system carries out welcome control (turning on a welcome light or the like), unlocks vehicle doors, and starts a vehicle driving device (for example, engine) as smart driving. The smart system includes an in-vehicle apparatus (IN-V APPA) 10 equipped to the vehicle and a mobile device (MB DEV) 20 carried by a user.

In the above-described system, a request signal having a frequency within an LF band is transmitted from the in-vehicle apparatus 10 to the mobile device 20, and a response signal having a frequency within a RF band is transmitted from the mobile device 20 to the in-vehicle apparatus 10 as a response to the request signal. In the present disclosure, LF signifies low frequency and RF signifies high frequency. In the present disclosure, the RF waves have higher frequencies than the LF waves.

The following will describe an LF band communication range. As known, RF signal has a short wavelength. Thus, communication utilizing a RF band is carried out in an area of radiation field even in a case of near field communication. Compared with RF signal, LF signal has a substantially long wavelength. Thus, wireless communication utilizing an LF band is carried out in an area of induction field. That is, near field communication utilizing the LF band, such as the start system communication, is carried out in the area of the induction field. The signals transmitted utilizing the RF band are attenuated in inverse proportion to the square of the range, and the signals transmitted utilizing the LF band are attenuated in inverse proportion to the third power of the range. For this reason, communication utilizing LF band can be carried out in a specific limited area.

The in-vehicle apparatus 10 includes a smart electronic control unit (SMART ECU) 1, an LF transmitting antenna 2, an LF transmission unit (LFTR) 3, an RF receiving antenna 4, an RF demodulation unit (RF DEMD) 5, a sensor (SENS) 6, and an actuator (ACTU) 7.

The LF transmitting antenna 2 wirelessly transmits signals (LF radio wave) having frequencies within the LF band. The LF transmission unit 3 is a circuit that modulates output signals of LF data from the smart ECU 1 to signals having frequencies within the LF band and outputs them to the LF transmitting antenna 2. Spread spectrum modulation or the like is adopted as a modulation method.

The following will describe a spread spectrum modulation. The spread spectrum modulation is one kind of communication method. In the spread spectrum modulation, a frequency band of data signals is widened by multiplying the signals by a spread code (spread modulation). At reception side, data signals are recovered by multiplying them by the same spread code at the same timing (de-spread demodulation). A peak strength level of an output signal decreases when a frequency band of the output signal is widened. Herein, the output signal is a signal that is output from the in-vehicle apparatus 10 and is to be transmitted to the mobile device 20. Thus, in the present embodiment, a compensation of the output signal strength level is carried out together with a broadening of the communication range.

The RF receiving antenna 4 wirelessly receives signals (RF radio wave) having frequencies within the RF band. The RF demodulation unit 5 is a circuit that demodulates the signals having frequencies within the RF band received by the RF receiving antenna 4, and outputs, to the smart ECU 1, signals of RF data corresponding to the signals having frequencies within the RF band.

The sensor 6 is attached to a door handle portion or the like of the vehicle. The sensor 6 detects a user's action of placing his or her hand on the door, and outputs a detection result to the smart ECU 1. The sensor 6 may be provided by, for example, a touch sensor.

The actuator 7 is a control target of the smart driving. The actuator 7 includes a welcome light actuator that controls turn-on or turn-off of the welcome light equipped to the vehicle and optical axis of the light. The actuator 7 also includes a starter motor (or engine ECU that controls the starter motor) of the vehicle engine, a door lock mechanism (door ECU that controls the door lock mechanism) that locks or unlocks the vehicle doors, or the like.

The smart ECU 1 is an electronic control unit that transmits or receives signals to or from the LF transmission unit 3, the RF demodulation unit 5, the sensor 6, and the actuator 7 in order to carry out the smart driving. The smart ECU 1 carries out the smart driving based on a communication with the mobile device 20. The smart ECU 1 includes a vehicle-side control unit (V-CONT) 13 or the like.

The vehicle-side control unit 13 is provided by a microcomputer including CPU, RAM, ROM, I/O, and the like, and accomplishes various processing using the RAM as a work area by the CPU executing programs stored in the ROM. Hereafter, the processing executed by the CPU of the vehicle-side control unit 13 is also referred to as a vehicle-side processing.

The mobile device 20 includes an LF receiving antenna 21, an LF reception unit (LF RC) 22, an RF transmitting antenna 24, an RF modulation unit (RF MD) 25, and a mobile-side control unit (MB CONT) 26.

The LF receiving antenna 21 receives the signals, which have frequencies within the LF band and are transmitted from the in-vehicle apparatus 10. The LF reception unit 22 is a circuit that demodulates the signals, which have frequencies within the LF band and are received by the LF receiving antenna 21. After demodulation, the LF reception unit 22 outputs signals of LF data to the mobile-side control unit 26. Spread spectrum modulation or the like is adopted as a demodulation method.

The RF transmitting antenna 24 wirelessly transmits the signals (RF radio wave) having frequencies within the RF band. The RF modulation unit 25 is a circuit that modulates output signals of RF data from the mobile-side control unit 26 to the signals having frequencies within the RF band, and outputs the modulated signals to the RF transmitting antenna 24.

The mobile-side control unit 26 is provided by a microcomputer including CPU, RAM, ROM, I/O, and the like and accomplishes various processing using the RAM as a work area by the CPU executing programs stored in the ROM. Hereafter, the processing executed by the CPU of the mobile-side control unit 26 is also referred to as mobile device-side processing.

Figure 2:
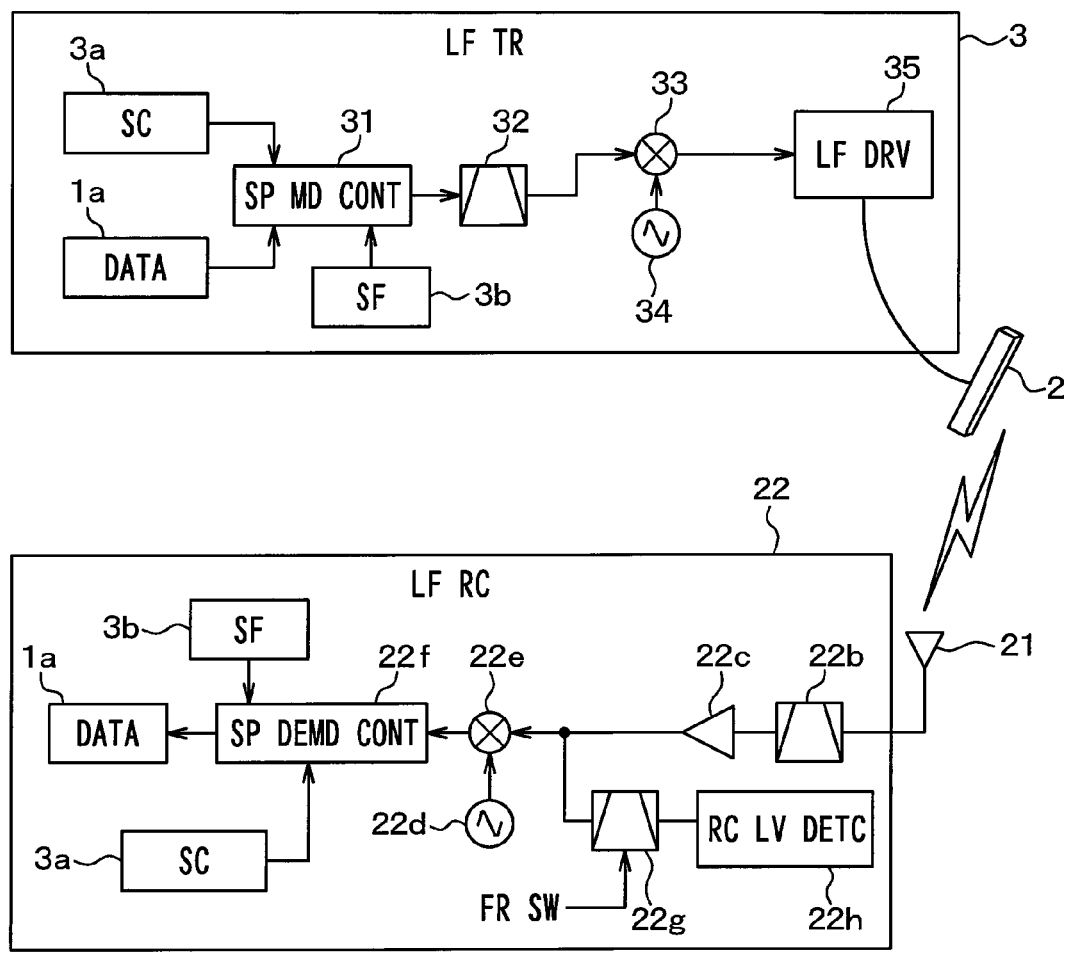
FIG. 2 is a diagram illustrating a configuration of an LF transmission unit and an LF reception unit.

A detailed description will be given to the LF transmission unit 3 of the in-vehicle apparatus 10 and the LF reception unit 22 of the mobile device 20. FIG. 2 illustrates a configuration of the LF transmission unit 3 and a configuration of the LF reception unit 22.

The LF transmission unit 3 includes a spread modulation control unit (SP MD CONT) 31, a band-pass filter 32, a primary modulation unit 33, a carrier output unit 34, and an LF driver (LF DRV) 35. The spread modulation control unit 31 carries out spread modulation by spread spectrum modulation to a data signal (DATA) 1a (equivalent to the above-mentioned LF data) inputted from the vehicle-side control unit 13. The spread modulation control unit 31 carries out the spread modulation with a spreading factor (SF) 3b specified by the vehicle-side control unit 13 and a spread code (SC) 3a preliminarily stored in a storage medium. The spread modulation control unit 31 then outputs the spread modulated signal (spread data signal) to the band-pass filter 32. The band-pass filter 32 extracts only a signal component having a predetermined frequency band from the inputted spread data signal, and transmits the extracted signal component to the primary modulation unit 33.

The primary modulation unit 33 carries out a primary modulation to the above-mentioned spread modulation signal outputted from the band-pass filter 32. The primary modulation unit 33 carries out the primary modulation using an LF carrier signal (sinusoidal signal having a frequency of 134 kHz) outputted from the carrier output unit 34. For example, Phase-Shift Keying (PSK) method may be adopted as the modulation method. The signal, which is modulated by the primary modulation unit 33, is inputted to the LF driver 35 as a signal having a frequency within the LF band.

The LF driver 35 amplifies the inputted signal having the frequency within the LF band with an amplification factor corresponding to a signal received from the control unit 13. The LF driver 35 then outputs the amplified signal having the frequency within the LF band to the LF transmitting antenna 2. Then, the LF transmitting antenna 2 transmits the amplified signal having the frequency within the LF band as a request signal.

The LF reception unit 22 includes a band-pass filter 22b, an amplifier 22c, a carrier output unit 22d, a primary demodulation unit 22e, a de-spread demodulation control unit (SP DEMD CONT) 22f, a frequency switching band-pass filter (FR SW) 22g, and a reception level detection unit (RC LV DETC) 22h. When the LF receiving antenna 21 receives the signal having the frequency within the LF band (the above-mentioned signal that has the frequency within the LF band and is transmitted from the in-vehicle apparatus 10), the band-pass filter 22b extracts only one signal component having a predetermined frequency band from the received signal, and outputs extracted signal component to the amplifier 22c. The amplifier 22c amplifies the inputted signal and outputs amplified signal to the primary demodulation unit 22e.

The frequency switching band-pass filter 22g changes a pass-through frequency band of inputted signal according to a frequency switching signal received from the vehicle-side control unit 13.

The reception level detection unit 22h detects a carrier of the signal outputted from the primary demodulation unit 22e, and detects a reception level of the signal outputted from the primary demodulation unit 22e.

The primary demodulation unit 22e carries out primary demodulation to the signal outputted from the amplifier 22c using an LF carrier signal (sinusoidal signal of 134 kHz). The LF carrier signal is outputted from the carrier output unit 22d. The primary demodulation unit 22e then outputs the demodulated signal to the de-spread demodulation control unit 22f. The same method (for example, PSK method) as in the primary modulation unit 33 may be adopted as the demodulation method.

The de-spread demodulation control unit 22f demodulates the signal outputted from the primary demodulation unit 22e with the spread code 3a (same as the spread code 3a used in the LF transmission unit 3) preliminarily stored in a storage medium. The de-spread demodulation control unit 22f then outputs a data signal 1a (LF data) obtained by the de-spread demodulation to the mobile-side control unit 26. Thus, the data signal 1a spread modulated at the LF transmission unit 3 is recovered to the original data 1a. The de-spread demodulation control unit 22f also performs a synchronization acquisition processing required for de-spread demodulation.

When the de-spread demodulation control unit 22f carries out the de-spread demodulation, the de-spread demodulation control unit 22f specifies a first reception level at a center frequency of a signal outputted from the primary demodulation unit 22e, and specifies a second reception level at a frequency that is separated from the center frequency by a predetermined frequency interval. The de-spread demodulation control unit 22f then specifies the spreading factor of the request signal from a level difference between the first reception level and the second reception level, and carries out the de-spread demodulation with a spreading factor equal to the specified spreading factor.

Figure 3:
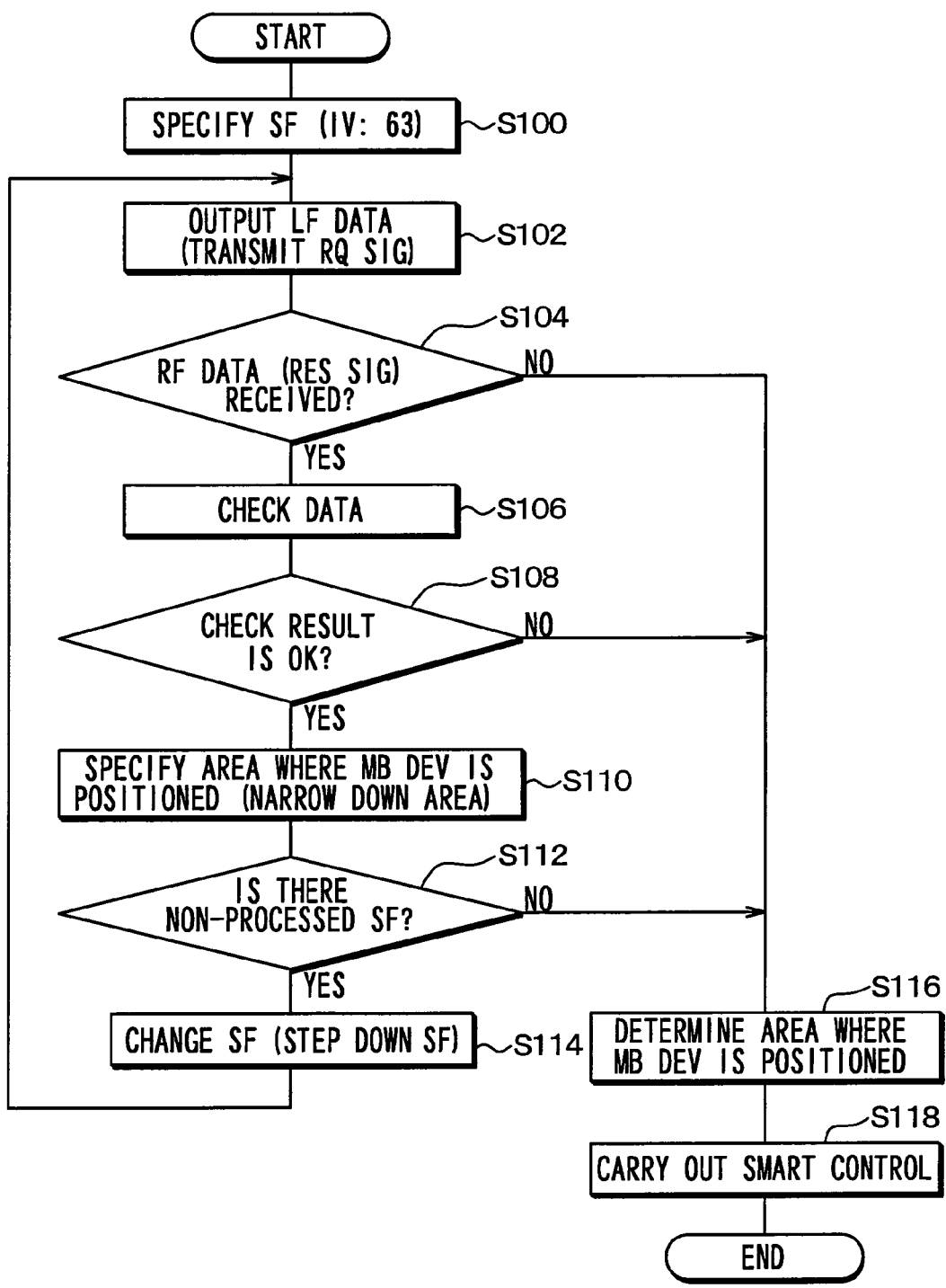
FIG. 3 is a flowchart showing a processing executed by a vehicle-side control unit of a smart ECU.
Figure 4:
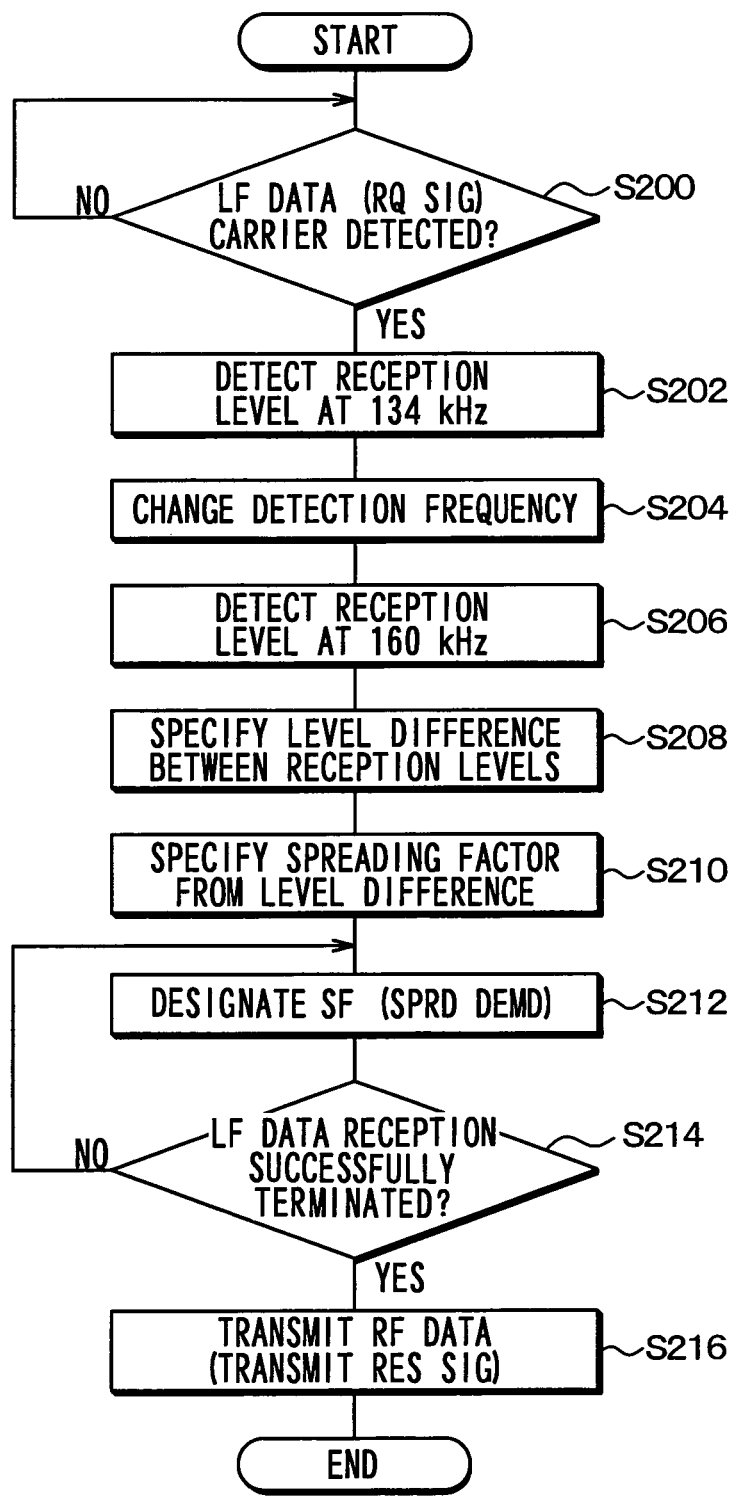
FIG. 4 is a flowchart showing a processing executed by a mobile-side control unit of a mobile device.

Hereafter, a description will be given to an operation of the smart system. FIG. 3 is a flowchart showing a processing carried out by the vehicle-side control unit 13 of the smart ECU 1, and FIG. 4 is a flowchart showing a processing carried out by the mobile-side control unit 26 of the mobile device 20.

The vehicle-side control unit 13 of the smart ECU 1 periodically carries out the processing shown in FIG. 3. The mobile-side control unit 26 of the mobile device 20 periodically carries out the processing shown in FIG. 4.

First, with respect to the spread modulation control unit 31 of the LF transmission unit 3, the vehicle-side control unit 13 sets the spreading factor (S100) to be used in the spread spectrum modulation to an initial value (IV). In the present embodiment, the initial value of the spreading factor is set to 63. Thus, the spreading factor is set to 63. Further, vehicle-side control unit 13 sets an amplification factor of the LF driver 35 to an initial value.

Subsequently, the vehicle-side control unit 13 outputs LF data to the LF transmission unit 3 (S102). The LF transmission unit 3 performs a spread modulation to the LF data with the spreading factor equal to 63 (first predetermined spreading factor), and performs a primary modulation. Then the request signal having the frequency within the LF band is wirelessly transmitted from the LF transmitting antenna 2. After the vehicle-side control unit 13 wirelessly transmits the request signal as mentioned above, a the vehicle-side control unit 13 is brought into a waiting state in which the vehicle-side control unit 13 waits for a response signal transmitted from the mobile device 20 in response to the request signal. The request signal to which the mobile device 20 transmits a response signal in response is also designated as a target request signal.

Meanwhile, the mobile-side control unit 26 carries out the processing shown in FIG. 4. The mobile-side control unit 26 periodically determines whether or not the carrier of LF data (request signal) has been detected (S200). Specifically, the reception level detection unit 22h determines whether or not the carrier of LF data (request signal) is detected.

When the mobile device 20 is not positioned in an area where it can receive the request signal and the carrier of LF data is not detected, a determination of NO is made at S200 and the determination processing of S200 is repeated. When the mobile device 20 is positioned in an area where it can receive the request signal and the carrier of LF data is detected, a determination of YES is made at S200. Then the mobile-side control unit 26 detects the reception level (equivalent to first reception level) at 134 kHz which is the center frequency of the request signal (S202). It is supposed that the band-pass frequency of the frequency switching band-pass filter 22g is set to 134-kHz band. The reception level at 134 kHz can be detected by the reception level detection unit 22h.

Subsequently, the mobile-side control unit 26 changes the detection frequency (S204). Specifically, the mobile-side control unit 26 changes the band-pass frequency of the frequency switching band-pass filter 22g to the 160-kHz band.

Subsequently, the mobile-side control unit 26 detects the reception level (equivalent to second reception level) at 160 kHz (S206). The reception level at 160 kHz can be detected by the reception level detection unit 22h.

Subsequently, the mobile-side control unit 26 specifies the level difference between the reception levels (S208). Specifically, the mobile-side control unit 26 calculates the difference between the reception level (equivalent to first reception level) at 134 kHz which is the center frequency of the request signal and the reception level (equivalent to second reception level) at 160 kHz.

Subsequently, the mobile-side control unit 26 specifies a spreading factor from the level difference (S210). The smart ECU 1 in the present embodiment is configured such that the request signals obtained by carrying out the spread spectrum modulation with the spreading factors from 63, 31, to 15 in stepwise manner are sequentially transmitted. Specifically, the mobile-side control unit 26 specifies the spreading factor as the following. The spreading factor is specified as 15 when the level difference is not lower than 15 decibels (dB), the spreading factor is specified as 31 when the level difference is not lower than 8 decibels (dB) and lower than 15 decibels (dB), and the spreading factor is specified as 63 when the level difference is lower than 7 decibels (dB).

Subsequently, the mobile-side control unit 26 designates the spreading factor specified at S210 as the spreading factor of the spread spectrum modulation, and controls the de-spread demodulation control unit 22f to perform the de-spread demodulation to the request signal with the spreading factor specified at S210 to decode the request signal (S212). The de-spread demodulation control unit 22f carries out synchronization acquisition processing and outputs LF data included in the request signal (signal whose center frequency is included in the LF band).

Subsequently, the mobile-side control unit 26 determines whether the reception of LF data has been successfully terminated (S214) based on a qualification determination result of LF data. Specifically, the mobile-side control unit 26 determines that the reception of LF data has been successfully terminated when LF data included in the request signal (signal whose center frequency is included in the LF band) is equal to the predetermined reference data.

When the reception of LF data has not been successfully terminated, the mobile-side control unit 26 returns to S212 and controls the de-spread demodulation control unit 22f to carry out the synchronization acquisition processing to repeatedly carry out the determination at S214. When the reception of LF data is successfully terminated, a determination of YES is made at S214, and the mobile-side control unit 26 transmits RF data (response signal) to the in-vehicle apparatus 10 (S216). Specifically, the mobile-side control unit 26 generates RF data and outputs it to the RF modulation unit 25. Then, the RF modulation unit 25 performs a modulation to the RF data, and wirelessly transmits the modulated RF data as an RF band signal through the RF transmitting antenna 24. The signals having frequencies within the RF band have longer attainable ranges than the signals having frequencies within the LF band.

When a signal having a frequency within the RF band and including RF data is transmitted as mentioned above, the RF receiving antenna 4 of the in-vehicle apparatus 10 receives the signal having the frequency within the RF band. Then, the RF demodulation unit 5 demodulates the received signal, and outputs RF data included in the signal to the vehicle-side control unit 13.

The description will be back to FIG. 3. The vehicle-side control unit 13 determines whether or not the RF data (response signal) has been received (S104).

When RF data (response signal) is received, a determination of YES is made at S104. Subsequently, the vehicle-side control unit 13 checks the RF data by comparing the received RF data with a predetermined reference data (S106) in order to determine whether the received RF data is a qualified data.

The vehicle-side control unit 13 determines whether the RF data is a qualified data based on the comparison result of data checking at S106 using a well-known method (S108). The vehicle-side control unit 13 determines whether the RF data is a qualified data, for example, by determining whether the RF data is equal to the reference data.

When the RF data is equal to the reference data, a determination of YES is made at S108 and the vehicle-side control unit 13 subsequently specifies the area within which the mobile device 20 is positioned (S110). As the spreading factor increases, the attainable range of the request signal increases. In the present embodiment, as described later, the spreading factor of spread spectrum modulation is reduced from 63 to 31 to 15 in stepwise manner to shorten the attainable range of the request signal in stepwise manner, and the area where the mobile device is positioned is thereby narrowed down in stepwise manner. In one example, suppose that a position of the mobile device 20 is specified as an area where the attainable range of the request signal is relatively long corresponding to the spreading factor=63.

Subsequently, the vehicle-side control unit 13 determines whether or not there is any spreading factor for which spread spectrum modulation has not been carried out (S112). In the present embodiment, the spreading factor is reduced from 63, 31, to 15 in stepwise manner. When there is any spreading factor for which spread spectrum modulation has not been carried out, a determination of YES is made. When the spread spectrum modulation has been carried out to all of the spreading factors, a determination of NO is made.

In this example, spread spectrum modulation has been carried out only with the spreading factor=63 and there are spreading factors for which spread spectrum modulation has not been carried out. Therefore, a determination of YES is made at S112 and the vehicle-side control unit 13 changes the spreading factor (S114). Specifically, the vehicle-side control unit 13 specifies the spreading factor to a spreading factor of 31, which is the adjacent value smaller than the value of 63. Further, the vehicle-side control unit 13 specifies the amplification factor of the LF driver 35 to a value smaller than the initially set value and returns to S102. The spreading factor before change is designated as a first predetermined spreading factor. Then, the spreading factor is changed based on the spreading factor before change at S114, and the spreading factor after change is also designated as a second predetermined spreading factor. The request signal that is modulated by the spread modulation with the first predetermined spreading factor and further modulated by the primary modulation and has a first attainable range corresponding to the LF band is designated as a first request signal. The request signal that is modulated by the spread modulation with the second predetermined spreading factor and further modulated by the primary modulation and has a second attainable range of the LF band is designated as a second request signal.

At S102, the LF transmission unit 3 performs the spread modulation to the LF data with the spreading factor=31, and further performs the primary modulation to the LF data. The LF data is then wirelessly transmitted as a request signal whose center frequency is included in the LF band through the LF transmitting antenna 2. Since the amplification factor of the LF driver 35 has been changed to a value smaller than the initial set value, the attainable range of the request signal is narrowed corresponding to the amplification factor.

For example, when the mobile device 20 is positioned in an area where the request signal spread modulated with the spreading factor=31 is receivable, a signal (response signal) having a frequency within the RF band and containing RF data is transmitted from the mobile device 20 in response to the reception of the request signal.

When the RF data is equal to the reference data, a determination of YES is made at S108 and the vehicle-side control unit 13 subsequently specifies the area where the mobile device 20 is positioned at S110 again. In this case, the area where the mobile device 20 is positioned is narrowed down to an area reachable by the request signal modulated with the spreading factor=31.

At S114 the vehicle-side control unit 13 specifies the spreading factor as 15, the smallest value, again and further specifies the amplification factor of the LF driver 35 to a further smaller value and returns to S102.

At S102, the LF transmission unit 3 performs the spread modulation to the LF data with the spreading factor=15, and performs the primary modulation to the LF data. Then, the LF data is wirelessly transmitted as a request signal whose center frequency is included in the LF band through the LF transmitting antenna 2. Since the amplification factor of the LF driver 35 has been changed to a further smaller value, the attainable range of the request signal is further narrowed corresponding to the amplification factor.

For example, when the mobile device 20 is positioned in an area where the request signal spread modulated with the spreading factor=15 is receivable, a signal (response signal) having a frequency included in the RF band an including the RF data is transmitted from the mobile device 20 in response to the reception of the request signal.

When the RF data is equal to the reference data, a determination of YES is made at S108 and the area where the mobile device 20 is positioned is subsequently specified at S112 again. In this case, the area where the mobile device 20 is positioned is narrowed down to an area within the attainable range of the request signal corresponding to the spreading factor=15.

As mentioned above, the area where the mobile device 20 is positioned is narrowed down. When there is no spreading factor for which spread spectrum modulation has not been carried out, a determination of NO is made at S112 and the area where the mobile device is positioned is determined (S116).

The area where a request signal spread modulated with the spreading factor=63 is receivable is designated as a long range area, the area where a request signal spread modulated with the spreading factor=31 is receivable is designated as a middle range area, and the area where a request signal spread modulated with the spreading factor=15 is receivable is designated as a short range area.

For example, at S110, when the position of the mobile device 20 is specified to be included in long range area, and then, the position of the mobile device 20 is specified to be included in the middle range area, and further, the position of the mobile device 20 is specified to be included in the short range area, the mobile device 20 can be finally determined to be positioned in the short range area.

For another example, when the position of the mobile device 20 is specified to be included in the long range area, and then, the position of the mobile device 20 is specified to be included in the middle range area but is specified to be not included in the short range area, the mobile device 20 can be finally determined to be positioned within the middle range area but out of the short range area.

For another example, when the position of the mobile device 20 is specified to be included in the long range area, and then, the position of the mobile device 20 is specified to be included in the middle range area, the mobile device 20 can be finally determined to be positioned within the long range area but out of the middle range area.

When the mobile device 20 is not positioned in an area where the request signal is receivable, a determination of NO is made at S104 and the processing proceeds to S116 and the area where the mobile device 20 is positioned is specified. In this case, it is determined that the mobile device 20 is not positioned at least within the long range area.

When the qualification determination of the mobile device 20 fails, a determination of NO is made at S108. Then, the processing proceeds to S116 and specifies the area where the mobile device 20 is positioned. Also in this case, the mobile device 20 is determined to be not positioned at least within the long range area.

At S118, the vehicle-side control unit 13 carries out smart control corresponding to the position of the mobile device 20. The smart control includes, for example, welcoming control and the like. Specifically, the vehicle-side control unit 13 carries out welcoming control and the like corresponding to the area where the mobile device 20 is positioned. In the welcoming control, for example, the actuator 7 may be used to illuminate the vicinity of the vehicle doors so that an illumination range of the welcoming light equipped to the vehicle is moved to the area where the mobile device 20 is positioned. In the welcoming control, a welcoming light may be turned on and further the illuminated area may be moved from a position distant (for example, position 3 m distant) from the vehicle and brought closer to the vehicle. This is done by moving the optical axis of the welcoming light to the area where the mobile device 20 is positioned. Then a standby state is established and kept until the next event (for example, an event of the driver touching the door, an event of engine start operation) occurs. When an event of the driver touching the door occurs, the doors are unlocked. When an event of engine start operation occurs, the engine is started.

Figure 5A:
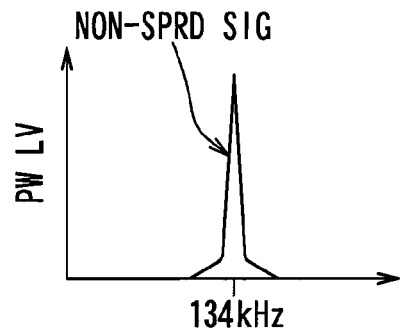
FIG. 5A is a diagram showing a spectrum of an original signal before a spread spectrum modulation.
Figure 5B:
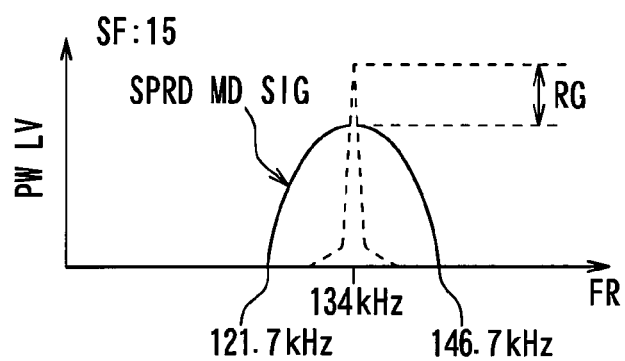
FIG. 5B to FIG. 5D are diagrams showing spectrums of a spectrum modulation signal which is modulated by spreading factors of 15, 31, and 63, respectively.
Figure 5C:
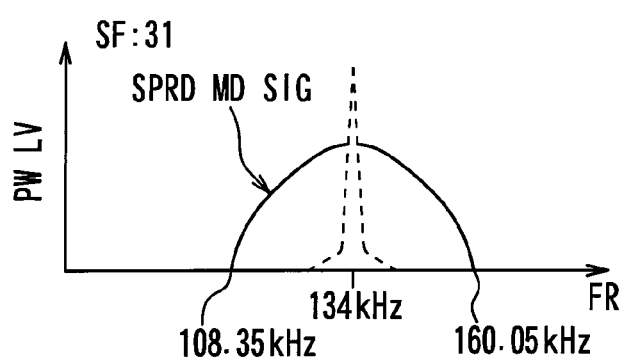
Figure 5D:
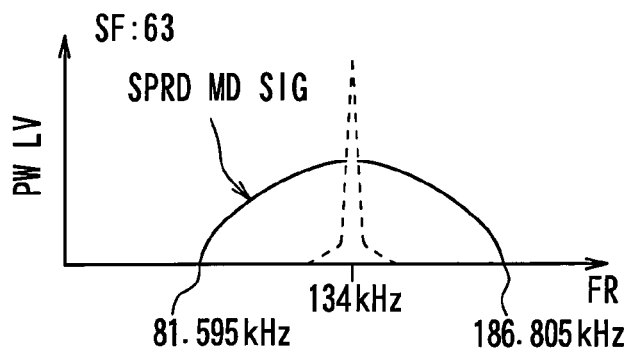

A description will be given to the relation between spreading factor and spectrum. FIG. 5A shows the spectrum of an original signal (NON-SPRD SIG) before spectrum spread, and FIG. 5B to FIG. 5D show the spectrum of spread modulated signal (SPRD MD SIG) when the spreading factor (SF) are set to 15, 31, and 63, respectively. As shown in the drawings, the spectrum is broadened with an increase of the spreading factor. The peak power level (PW LV) of the spread spectrum modulated signal is lower than the peak power level (PW LV) of the original signal before spread spectrum modulation. The adjustable range (RG) of transmission output is increased with increase in the difference between the peak power level of the original signal and the peak power level of the spread spectrum modulated signal.

FIG. 6 shows the relation between the power level after spread modulation and the power level after de-spread demodulation observed when the spreading factor is set to 63, 31, 15, and 0. FIG. 6A shows the power levels (PW LV) of spread modulated signals (SPRD MD SIG), and FIG. 6B shows the power levels (PW LV) of de-spread demodulated signals (SPRD DEMD SIG).

A case where the spreading factor=63 and a case where the spreading factor=0 are compared with each other. In either case, the peak level after spread modulation is set to the same output rating upper limit (LMT). However, the peak level after de-spread demodulation to the signal modulated with the spreading factor=63 is 18 dB higher than the peak level of the signal which is modulated with spreading factor=0.

A description will be given to the strength of a signal having LF band frequency and transmitted from the mobile device 20. As already described above, In the present embodiment, the spread modulation control unit 31 of the LF transmission unit 3 spread modulates predetermined LF data (data signal 1a) with a predetermined spread code 3a, and the band-pass filter 32 generates a spread data signal. The primary modulation unit 33 converts the spread data signal into a modulated signal of having LF band frequency, and an external lead 35a amplifies the modulated signal and outputs the signal as a request signal to the antenna 2.

If the predetermined LF data is inputted directly to the primary modulation unit 33 without passing through the spread modulation control unit 31 and the band-pass filter 32, the primary modulation unit 33 performs the primary modulation to the LF data, the LF driver 35 amplifies the modulated LF data, the LF transmitting antenna 2 transmits the amplified LF data. FIG. 7A shows the frequency spectrum of the signal, which is not spread-modulated and has a LF band frequency. The signal is transmitted by the LF transmitting antenna 2. In each drawing from FIG. 7B to FIG. 7D, the vertical axis indicates the power level LFout (unit: dBm) of a signal sent out from the LF transmitting antenna 2, and the horizontal axis indicates frequency FR (unit: kHz).

When the same LF data as in the example in FIG. 7A is spread modulated by the spread modulation control unit 31 as described in the present embodiment, the frequency spectrums modulated with the spreading factors of 15, 31, and 63 become the spectrums shown in FIG. 7B, FIG. 7C, and FIG. 7D, respectively. In these cases, the peak level of output power is reduced, respectively, by 8.76 dB, 12.3 dB, and 14.47 dB as compared with the case in FIG. 7A.

As mentioned above, the peak level of output power of spread modulated LF data signal is lower than that of non-modulated LF data signal. Therefore, it is possible to keep the field strength within a desired range and to increase the amplification factor of signals compared with a case where the LF data is not spread modulated. As a result, it is possible to keep the field strength of the request signal transmitted from the in-vehicle apparatus to the mobile device within a desired range, and to increase the attainable range of the request signal.

Figure 8:
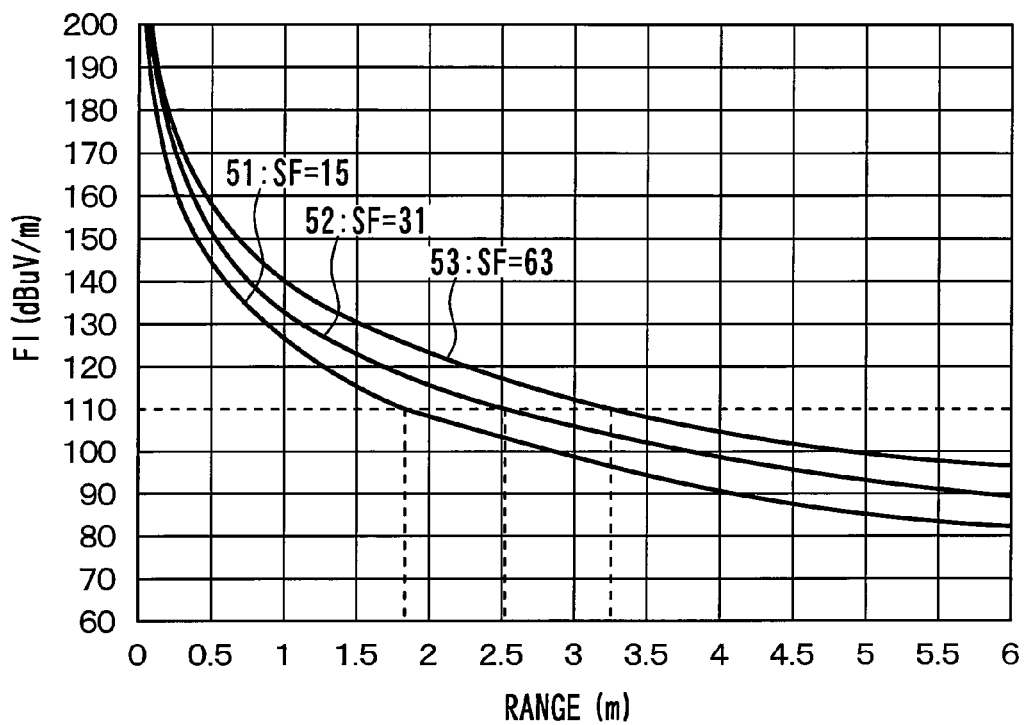
FIG. 8 is a diagram showing a relation between an output field strength and a communication range of a request signal when the request signal is modulated by different spreading factors.

FIG. 8 shows the relation between the output strength, that is, field strength (FI) and communication range of request signals at each point with different spreading factors. In FIG. 8, the horizontal axis indicates communication range (unit: m) and the vertical axis indicates output strength (unit: dBuV/m). In the drawing, a solid line 51 indicates the output strength obtained when the spreading factor=15, a solid line 52 indicates the output strength obtained when the spreading factor=31, and a solid line 53 indicates the output strength obtained when the spreading factor=63.

When the mobile device 20 with the reception sensitivity of 110 dBuV/m is used, the distance d corresponding to the output strength=110 dBuV/m is the communication range. That is, the communication range corresponding to the spreading factor=15 is 1.8 meters, the communication range corresponding to the spreading factor=31 is 2.5 meters, and the communication range corresponding to the spreading factor=63 is 3.2 meters. When spread modulation is not carried out (when the spreading factor=0), though not shown in the drawing, the communication range is 1.7 meters.

The mobile device 20 according to the present embodiment is so configured that, with attention paid to that how the band of a spectrum is widened differs depending on the spreading factor, the second reception level in a frequency band a certain frequency distant from the center frequency of a request signal is specified. Then, the spreading factor of the request signal is specified using this second reception level. Then, the request signal is de-spread demodulated with a spreading factor same with the specified spreading factor.

Figure 9:
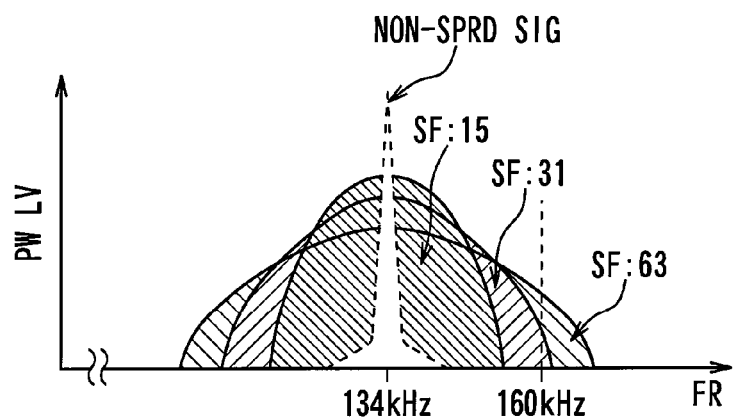
FIG. 9 is a diagram showing, in an overlaid manner, a spectrum of an original signal before spread spectrum modulation and spectrums of the modulation signals when the original signal is modulated by the spreading factors of 15, 31, and 63.

FIG. 9 shows, in an overlaid manner, the spectrum of an original signal (NON-SPRD SIG) before it is spread spectrum modulated and the spectrums of signals (SPRD MD SIG) that are done by spread modulation with the spreading factor=15, 31, and 63, respectively. In the present embodiment, the frequency of the second reception level is set to 160 kHz. The spreading factor can be specified as follows by setting the frequency of the second reception level to 160 kHz. When the second reception level=0, the spreading factor is specified as 15. When the second reception level is higher than 0 and lower than a certain reference value, the spreading factor is specified as 31. When the second reception level is equal to or higher than the reference value, the spreading factor is specified as 63.

As mentioned above, a first reception level at the center frequency of a request signal and a second reception level in a frequency band a certain frequency distant from the center frequency are specified. The spreading factor of the request signal is specified using the second reception level. With this configuration, a spreading factor for carrying out de-spread demodulation can be specified in a short time.

With the above-mentioned configuration, the in-vehicle apparatus 10 spread spectrum modulates transmit data with a predetermined spreading factor, and transmits a spread spectrum modulated request signal having LF band frequency. Therefore, the peak power of the request signal can be reduced. Further, it is possible to increase the power adjustable range within a power limit value, and to keep the field strength of a request signal, which is transmitted from the in-vehicle apparatus to the mobile device, within a desired range and increase the range of the request signal. Transmit data is spread spectrum modulated with the spreading factor, which varies in stepwise manner, and the transmission unit 3 transmits multiple request signals having different attainable ranges. The reception of a response signal transmitted from the mobile device 20 in response to the request signal is determined. Based on the result of the determination of reception of the response signal, the area where the mobile device 20 is positioned is specified among a plurality of divided areas. Therefore, the position of the mobile device can be specified more accurately.

Since the radio waves having LF band frequencies are defined to be lower in transmission field strength than the radio waves having high frequency band, they involve a problem of a relatively short communication range. However, the in-vehicle apparatus 10 includes the LF driver 35 for adjusting the transmission level of request signals transmitted from the LF transmitting antenna 2, and instructs the LF driver 35 to carry out processing so that the transmission level of a request signal is increased with increase in the spreading factor of spread spectrum modulation.

As mentioned above, the LF driver 35 is instructed to carry out processing so that the transmission level of a request signal is increased with increase in the spreading factor of spread spectrum modulation. With this configuration, the field strength of a request signal can be set to the maximum value within a desired range and the communication range of the request signal can be broadened.

When the mobile device 20 receives a request signal from the in-vehicle apparatus 10, the mobile device 20 specifies a first reception level at the center frequency of the request signal, and further specifies a second reception level in a frequency band that is distant from the center frequency by a predetermined frequency. Then, the mobile device 20 specifies the spreading factor of the request signal from the level difference between the first and second reception levels, and de-spread demodulates the request signal with the spreading factor the same with the specified spreading factor of the request signal to decode the request signal. Thus, the spreading factor for carrying out the de-spread demodulation can be specified in a short time, and decoding of the request signal can be carried out in a short time.

The in-vehicle apparatus 10 reduces the spreading factor in stepwise manner and controls the LF transmission unit 3 to sequentially transmit multiple spread spectrum modulated request signals. When response signal reception error is determined to be occurred, the transmission of the request signals from the LF transmission unit 3 is interrupted. With this configuration, a useless transmission of request signal can be restricted.

OTHER EMBODIMENTS

The present disclosure is not limited to the above-mentioned embodiment and can be embodied in various modes based on the subject matter of the present disclosure.

In the first embodiment, the spreading factor is reduced in stepwise manner, multiple spread spectrum modulated request signals are sequentially transmitted from the LF transmission unit 3, and when a response signal reception error is determined to be occurred, the specification of the area where the mobile device 20 is positioned is interrupted. Alternatively, the spreading factor may be increased stepwise manner, multiple spread spectrum modulated request signals are transmitted from the LF transmission unit 3, and when a response signal reception error is determined to be occurred, the specification of the area where the mobile device 20 is positioned may be interrupted. In this case, a useless transmission of the request signal can be restricted.

In the above first embodiment, the amplification factor of the LF driver 35 is reduced corresponding to a reduction in the spreading factor of the spread modulation control unit 31. Alternatively, the amplification factor of the LF driver 35 may be set to a fixed value regardless of the spreading factor of the spread modulation control unit 31. Further, the amplification factor of the LF driver 35 may be increased with reduction of the spreading factor of the spread modulation control unit 31.

In the above first embodiment, the spreading factor is changed in stepwise manner by three steps. Alternatively, the spreading factor may be changed in two steps or in four or more steps. The value of the spreading factor is not limited to 63, 31, or 15 as described in the above embodiment.

The processing carried out at S100, S102, and S114 in the above embodiment corresponds to a transmission control unit. The processing carried out at S104 to S108 corresponds to a reception determination unit. The processing carried out at S110 corresponds to a position determination unit. The LF driver 35 corresponds to an adjustment unit that adjusts the transmission level of each of multiple request signals. The processing carried out at S202 to S206 corresponds to a reception level specification unit. The processing carried out at S208 to S210 corresponds to a spreading factor specification unit. The processing carried out at S212 corresponds to a decoding processing unit.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A wireless communication system comprising:
a mobile device carried by a user; and
an in-vehicle apparatus equipped to a vehicle and communicatively connected with the mobile device,
wherein the in-vehicle apparatus includes:
a transmission unit generating a plurality of request signals by performing a spread spectrum modulation to a transmit data with a plurality of predetermined spreading factors and transmitting each of the request signals to the mobile device, each of the request signals having a frequency within a low frequency band, the request signals including a first request signal and a second request signal and the spreading factors including a first predetermined spreading factor and a second predetermined spreading factor;
a transmission control unit setting the first predetermined spreading factor and setting the second predetermined spreading factor based on the first predetermined spreading factor, and controlling the transmission unit to generate and transmit each of first request signal and the second request signal to the mobile device, the transmission control unit controlling the transmission unit to generate the first request signal having a first attainable range by performing the spread spectrum modulation to the transmit data with the first predetermined spreading factor, the transmission control unit controlling the transmission unit to generate the second request signal having a second attainable range by performing the spread spectrum modulation to the transmit data with the second predetermined spreading factor;

a reception determination unit determining a reception of a response signal from the mobile device, the mobile device transmitting the response signal in response to a reception of a target request signal that is one of the first request signal and the second request signal; and a position determination unit specifying the first attainable range or the second attainable range as an area where the mobile device is positioned when the reception determination unit determines the reception of the response signal, and wherein the mobile device includes:

a reception level specification unit specifying, in response to the reception of the target request signal from the in-vehicle apparatus, a first reception level at a center frequency band of the target request signal and a second reception level at a frequency band that is different from the center frequency band by a predetermined frequency;

a spreading factor specification unit specifying the spreading factor of the target request signal based on a level difference between the first reception level and the second reception level; and a decoding processing unit performing a de-spread demodulation to the target request signal with a spreading factor, which has a value equal to the spreading factor specified by the spreading factor specification unit, to decode the target request signal.

2. The wireless communication system according to claim 1, wherein the in-vehicle apparatus further includes:

a transmitting antenna transmitting the request signals to the mobile device; and an adjustment unit adjusting a transmission level of each of the request signals transmitted by the transmitting antenna, and wherein, when the first predetermined spreading factor is larger than the second predetermined spreading factor, the transmission control unit controls the adjustment unit to adjust the transmission level of the first request signal to be higher than the transmission level of the second request signal.

3. The wireless communication system according to claim 1, wherein the transmission control unit sets the second predetermined spreading factor smaller than the first predetermined spreading factor based on the first predetermined spreading factor, and controls the transmission unit to sequentially transmit the first request signal and second request signal to the mobile device, and wherein, when the reception determination unit determines that an error occurs to the reception of the response signal that corresponds to the target request signal, the transmission control unit controls the transmission unit to interrupt a transmission of the target request signal.

4. The wireless communication system according to claim 1, wherein the transmission control unit sets the second predetermined spreading factor larger than the first predetermined spreading factor based on the first predetermined spreading factor, and controls the transmission unit to sequentially transmit the first request signal and second request signal to the mobile device, and wherein, when the reception determination unit determines that an error occurs to the reception of the response signal that corresponds to the target request signal, the transmission control unit controls the transmission unit to interrupt a transmission of the target request signal.

* * * * *